United States Patent
Hori

(10) Patent No.: US 7,331,895 B2
(45) Date of Patent: Feb. 19, 2008

(54) COMPOSITE PLANETARY DEVICE

(75) Inventor: Kohei Hori, Minamiazumi-gun (JP)

(73) Assignee: Harmonic Drive Systems Inc., Tokyo (JP)

( * ) Notice: Subject to any disclaimer, the term of this patent is extended or adjusted under 35 U.S.C. 154(b) by 135 days.

(21) Appl. No.: 10/563,292

(22) PCT Filed: Dec. 13, 2004

(86) PCT No.: PCT/JP2004/018570

§ 371 (c)(1),
(2), (4) Date: Dec. 30, 2005

(87) PCT Pub. No.: WO2005/066519

PCT Pub. Date: Jul. 21, 2005

(65) Prior Publication Data

US 2006/0166781 A1     Jul. 27, 2006

(30) Foreign Application Priority Data

Jan. 5, 2004    (JP) .............................. 2004-000393

(51) Int. Cl.
*F16H 57/12* (2006.01)
(52) U.S. Cl. .................. 475/183; 475/335; 74/409
(58) Field of Classification Search ................ 475/183, 475/335, 344, 904
See application file for complete search history.

(56) References Cited

U.S. PATENT DOCUMENTS 3,548,673 A * 12/1970 Suchocki ................ 74/409

(Continued)

FOREIGN PATENT DOCUMENTS

JP    63-11963    1/1988

(Continued)

OTHER PUBLICATIONS

DR Gears. Pitch Diameter [online], [retrieved on Jul. 2, 2007]. Retrieved from the Internet:<http://www.drgears.com/gearterms/terms/pitchdiameter.htm>.*

(Continued)

*Primary Examiner*—Sherry Estremsky
*Assistant Examiner*—Edwin A Young
(74) *Attorney, Agent, or Firm*—Buchanan Ingersoll & Rooney PC

(57) ABSTRACT

A composite planetary speed reduction device (1), wherein gears (11), (12), and (13) and rollers (21), (22), and (23) forming a planetary gear speed reduction mechanism (10) and a planetary roller speed reduction mechanism (20) are integrally rotated around a common rotating center axis, respectively. The radius of the sun roller (21) is larger by $\Delta r_1$ than the radius $r_1$ of the working pitch circle of the sun gear (11), the radius $r_{21}$ of the working pitch circle of the planetary gear (12) meshing with the sun gear (11) and the radius $r_{23}$ of the working pitch circle of the planetary gear (12) meshing with an internal gear (13) are different from each other, and the radius of the planetary roller (22) is smaller by $\Delta r_1$ than the radius $r_{21}$ of the working pitch circle of the planetary gear (12). Thus, a slippage ratio $s_1$ between the sun roller (21) and the planetary roller (22) and a slippage ratio $s_2$ between the planetary roller (22) and the ring roller (23) are made equal to each other, and a large output torque can be provided from the planetary roller speed reduction mechanism (20).

2 Claims, 3 Drawing Sheets

U.S. PATENT DOCUMENTS 5,092,190 A * 3/1992 Kubo et al. .................... 74/410
2004/0154422 A1* 8/2004 Menjak et al. ................. 74/440

FOREIGN PATENT DOCUMENTS

| | | |
|---|---|---|
| JP | 09-168910 | 6/1997 |
| JP | 2000-205358 A | 7/2000 |
| JP | 2002-213566 A | 7/2002 |

OTHER PUBLICATIONS

International Search Report for Application No. PCT/JP2004/018570, dated Jan. 12, 2005.

* cited by examiner

COMPOSITE PLANETARY DEVICE

TECHNICAL FIELD

The present invention relates to a composite planetary device wherein gears forming a planetary gear mechanism and a planetary roller mechanism are each integrally rotated around a common rotating center axis. It particularly relates to a composite planetary device having a planetary roller mechanism that provides high output torque.

BACKGROUND ART

Composite planetary devices comprised of a planetary gear mechanism and planetary roller mechanism are disclosed by JP A 9-168910 and JP A 2002-213566, for example. As disclosed in these patent documents, a planetary gear speed reducer can transmit a large torque but has the problems of backlash and meshing noise. A planetary roller speed reducer has zero backlash and low noise. However, it continually produces slippage, which makes it unsuitable for positioning mechanisms and the like, and also has the problem of not being able to transmit a large torque. A composite planetary device can mutually compensate for the drawbacks of a planetary gear speed reducer and planetary roller speed reducer, making it possible to effectively utilize the merits of both mechanisms.

However, conventional composite planetary devices have the following problems. With the composite planetary device disclosed by the above JP A 9-168910 and the like, as shown in the schematic diagram of FIG. 4, the radius of the working pitch circle of each of the gears of the planetary gear mechanism and the radius of each of the rollers of the planetary roller mechanism are the same. Therefore, the speed reduction ratio $U_g$ of the planetary gear mechanism and the speed reduction ratio $U_r$ of the planetary roller mechanism are the same, and the slippage ratio $s_1$ between the sun roller and planetary roller and the slippage ratio $S_2$ between the planetary roller and the ring roller are both zero. In this case, the roller drive force (tractive force) of the planetary roller mechanism is small, and the output torque is small.

As disclosed in JP A 2002-213566, in order to increase the torque, the roller drive force of the planetary roller mechanism can be increased by generating slippage between the rollers of the planetary roller mechanism. FIG. 5 is a schematic diagram of this case. Here, the radius of the sun roller is made larger by $\Delta r_1$ than the radius $r_1$ of the working pitch circle of the sun gear, along with which the radius of the planetary roller is made smaller by $\Delta r_1$ than the radius $r_2$ of the working pitch circle of the planetary gear, and the internal radius of the ring roller is also made smaller by $\Delta r_1$ than the radius $r_3$ of the working pitch circle of the internal gear. In this case, the speed reduction ratio $U_r$ of the planetary roller mechanism is different from the speed reduction ratio $U_g$ of the planetary gear mechanism, and slippage is generated between the sun roller and the planetary roller, and between the planetary roller and the ring roller.

In this case, the slippage between the planetary roller and the ring roller is in the opposite direction from the slippage between the sun roller and the planetary roller. For example, if a positive slippage ratio $s_1$ is applied between the sun roller and the planetary roller, a negative slippage ratio $s_2$ is generated between the planetary roller and the ring roller. Thus, the roller drive forces generated between the rollers cancel each other out, making it impossible to obtain a large output torque.

DISCLOSURE OF THE INVENTION

In view of the above problems, an object of the present invention is to provide a composite planetary device that can efficiently increase the output torque of a planetary roller mechanism.

To solve the above problems, a composite planetary device of the present invention comprises:

a planetary gear mechanism equipped with a sun gear, a planetary gear (or planetary gears) and an internal gear and a planetary roller mechanism equipped with a sun roller, a planetary roller (or planetary rollers) and a ring roller, wherein the sun gear and the sun roller are integrally rotated around a common rotating center axis, the planetary gear(s) and the planetary roller(s) are integrally rotated around a common planetary shaft (or common planetary shafts), and the internal gear and the ring roller rotate integrally around the rotating center axis or can be fixed concentrically, characterized in that a radius of the sun roller is larger by $\Delta r_1$ than a radius $r_1$ of a working pitch circle of the sun gear, a radius of the planetary roller(s) is smaller by $\Delta r_1$ than a radius $r_{21}$ of the working pitch circle of the planetary gear(s), a radius $r_{21}$ of a working pitch circle of the planetary gear meshing with the sun gear is larger than a radius $r_{23}$ of a working pitch circle of the planetary gear(s) meshing with the internal gear.

In the composite planetary device of this invention, slippage is generated between the sun roller and the planetary roller, and slippage is also generated between the planetary roller and the ring roller. Also, the direction and amount of the slippage of these parts can be made the same. That is, if $s_1$ is the slippage ratio between the sun roller and the planetary roller and $s_2$ is the slippage ratio between the planetary roller and the ring roller, $s_1=s_2>0$ can be effected.

A planetary roller mechanism having these slippage ratios can be achieved by combining gears of the planetary gear mechanism having numbers of teeth that satisfy equation (1), making the radius of the sun roller larger than the radius of the working pitch circle of the sun gear by a radius increase amount $\Delta r_1$ given by equation (2), and making the radius of the planetary roller larger than the radius of the working pitch circle of the planetary gear meshing with the internal gear by an amount $\Delta r_2$ given by equation (3).

$$j=(Z_d-Z_a)/2-Z_b>0 \qquad (1)$$

Here
j: Planetary gear teeth reduction number
$Z_a$: Number of sun gear teeth
$Z_b$: Number of planetary gear teeth
$Z_d$: Number of internal gear teeth $$\Delta r_1 = \frac{r_{21}-r_{23}}{\frac{r_{23}\left(1+\frac{r_1}{r_{21}}\right)}{r_1\left(1-\frac{r_{23}}{r_3}\right)}+1} \qquad (2)$$

$$\Delta r_2 = r_{21}-r_{23}-\Delta r_1 \qquad (3)$$

Here
$r_1$: Radius of working pitch circle of sun gear
$r_{21}$: Radius of the working pitch circle of the planetary gear meshing with the sun gear
$r_{23}$: Radius of the working pitch circle of the planetary gear meshing with the internal gear
$r_3$: Radius of the working pitch circle of the internal gear With the composite planetary device of this invention, the amount and direction of the slippage between the sun roller and the planetary roller in the planetary roller mechanism thereof are the same as the amount and direction of the slippage between the planetary roller and the ring roller. Therefore, the roller drive force generated between the rollers can be effectively output as the output torque. As a result, the output torque of the planetary roller mechanism can be increased, the function of the planetary roller mechanism in the low torque region of the planetary gear mechanism is superior to that of the planetary gear mechanism, the impact on the drive side tooth surfaces of the gears is decreased, making it possible to reduce meshing noise. Also, the high torque of the planetary roller mechanism also has the effect of increasing torsional stiffness in the low torque region of the planetary gear mechanism.

BEST MODE FOR CARRYING OUT THE INVENTION

An example of a composite planetary speed reduction device that applies the present invention is described below, with reference to the drawings.

Figure 1:
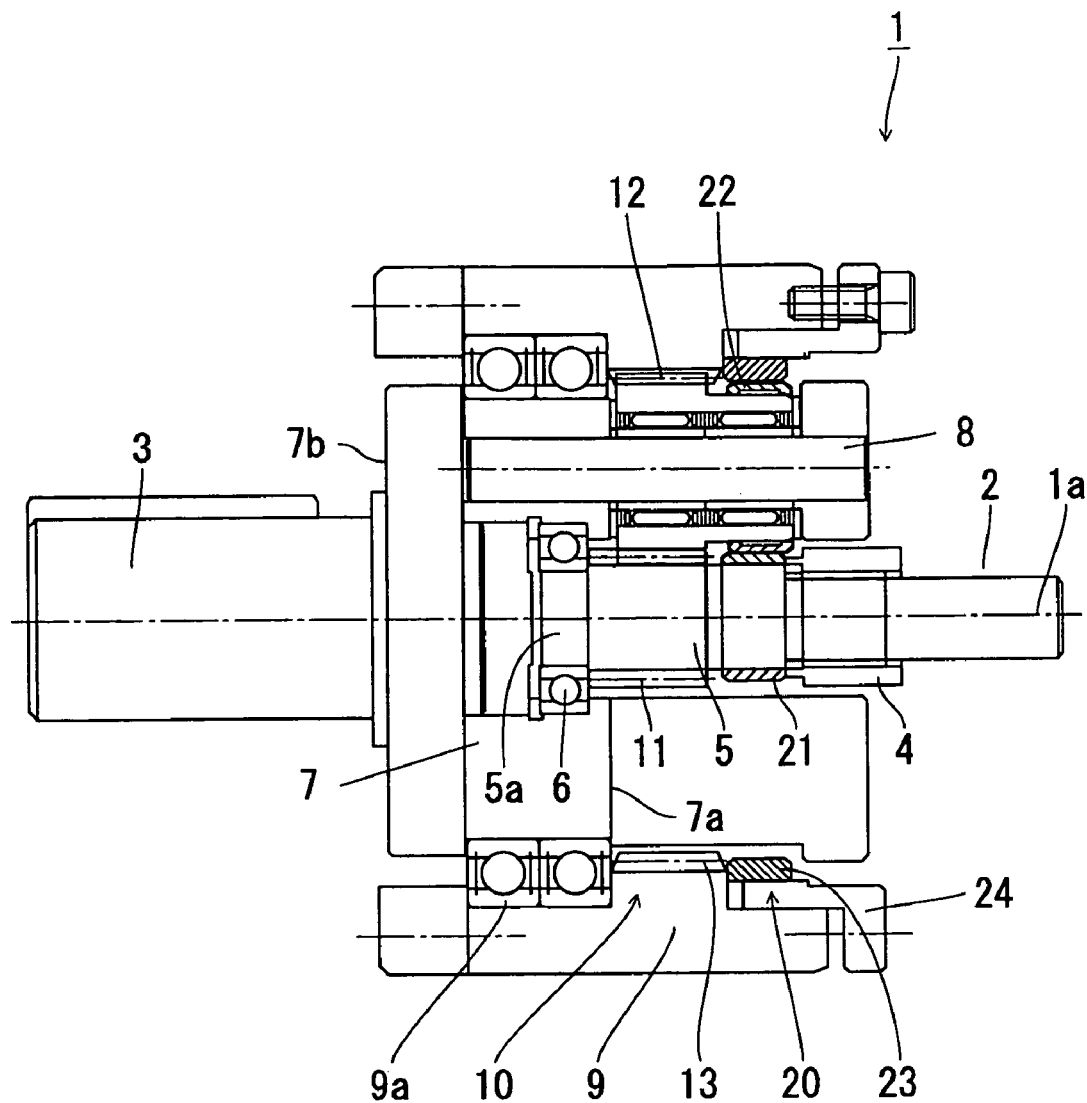
FIG. 1 is a cross-sectional view of a composite planetary device that applies the present invention.

FIG. 1 is a cross-sectional view of a composite planetary speed reduction device of this example. The composite planetary speed reduction device 1 has an input shaft 2 disposed at one side and an output shaft 3 disposed at the other side, concentrically with a device axis 1$a$, between which there are a planetary gear mechanism 10 and a planetary roller mechanism 20 disposed in parallel. Gears of the planetary gear mechanism 10 and corresponding rollers of the planetary roller mechanism 20 are respectively integrally rotated around the same rotating axes.

Described in further detail, a sun shaft 5 is fixedly coupled concentrically on the input shaft 2. On a tapered portion of the input shaft side of the sun shaft 5, there is formed a sun roller 21 positioned by a nut 4; and a sun gear 11 is formed on the output shaft side. The end portion 5$a$ of the output side of the sun shaft 5 rotatably supported by a planetary carrier 7, via a bearing 6. A plurality of planetary shafts 8 are affixed to an annular end surface 7$a$ of the input side of the planetary carrier 7. The planetary shafts 8 extend to the input side, parallel to the device axis 1$a$. A planetary gear 12 and a planetary roller 22 are supported in a freely rotatable state by each of the planetary shafts 8. Each planetary gear 12 meshes with the sun gear 11, and each planetary roller 22 is in rolling contact with the sun roller 21.

The planetary carrier 7, planetary gear 12 and planetary roller 22 are enclosed by a cylindrical device housing 9. The planetary carrier 7 is supported by a bearing 9$a$ so that it freely rotates on the inside surface of the device housing 9. An internal gear 13 that meshes with the planetary gears 12 is integrally formed on a portion of the inside surface of the device housing 9 that is more towards the input shaft side than the bearing 9$a$. Disposed concentrically on the input shaft side of the internal gear 13 is a ring roller 23 in rolling contact with the planetary rollers 22. The ring roller 23 is affixed to the device housing 9 via a roller support member 24. The output shaft 3 is formed integrally with the planetary carrier 7, and projects concentrically from the center of a circular end surface 7$b$ on the output side.

Figure 2:
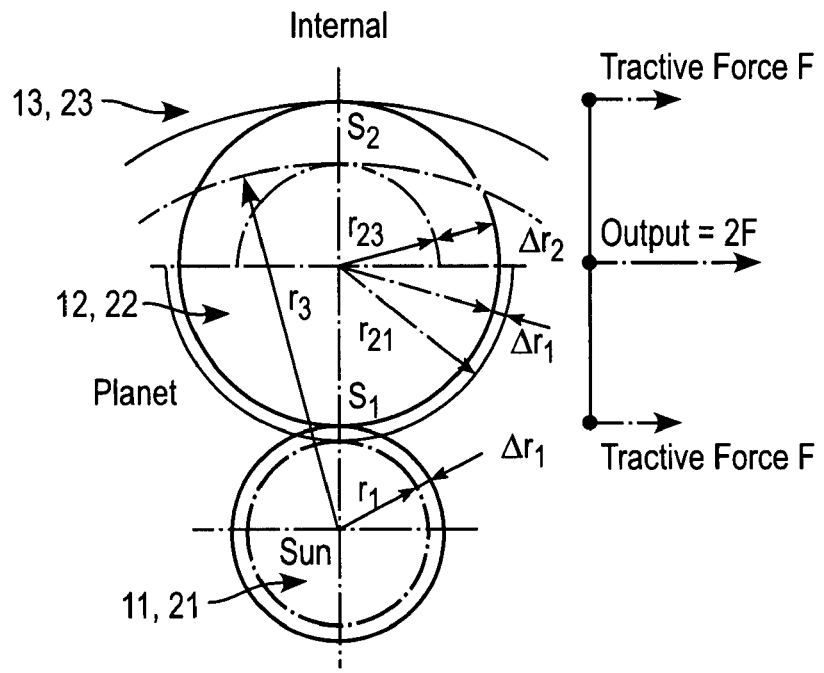
FIG. 2 is a schematic diagram showing the configuration of the invention.

In order to increase the output torque of the planetary roller mechanism 20, the composite planetary speed reduction device 1 of this example is configured as shown in FIG. 2. Explained with reference to FIG. 2, it is set so that if $s_1$ is the slippage ratio between the sun roller 21 and the planetary rollers 22 and $s_2$ is the slippage ratio between the planetary rollers 22 and the ring roller 23, $s_1 = s_2 > 0$. The relationship is satisfied by using a combination of the gears 11, 12 and 13 of the planetary gear mechanism 10 having numbers of teeth that satisfy equation (1). Also, the radius of the sun roller 21 is made larger than the radius $r_1$ of the working pitch circle of the sun gear 11 by a radius increase amount $\Delta r_1$ given by equation (2). In addition, the radius $r_{22}$ of the planetary rollers 22 is made larger than the radius $r_{23}$ of the working pitch circle of the planetary gears 12 meshing with the internal gear 13 by an amount $\Delta r_2$ given by equation (3).

$$j = (Z_d - Z_a)/2 - Z_b > 0 \tag{1}$$

Here
j: Planetary gear teeth reduction number
$Z_a$: Number of sun gear teeth
$Z_b$: Number of planetary gear teeth
$Z_d$: Number of internal gear teeth $$\Delta r_1 = \frac{r_{21} - r_{23}}{\frac{r_{23}\left(1 + \frac{r_1}{r_{21}}\right)}{r_1\left(1 - \frac{r_{23}}{r_3}\right)} + 1} \tag{2}$$

$$\Delta r_2 = r_{21} - r_{23} - \Delta r_1 \tag{3}$$

Here
$r_1$: Radius of working pitch circle of sun gear
$r_{21}$: Radius of the working pitch circle of the planetary gear meshing with the sun gear
$r_{23}$: Radius of the working pitch circle of the planetary gear meshing with the internal gear
$r_3$: Radius of the working pitch circle of the internal gear By combining teeth numbers to satisfy the condition 0<j of equation (1), the radius $r_{23}$ of the working pitch circle of the planetary gear 12 meshing with the internal gear 13 becomes smaller than the radius $r_{21}$ of the working pitch circle of the planetary gear 12 meshing with the sun gear 11, as drawn in an exaggerated way in the schematic drawing of FIG. 2. Also, equation (2) and equation (3) are calculated from the condition that the slippage ratio $s_1$ between the sun roller 21 and the planetary roller 22 and the slippage ratio $s_2$ between the planetary roller 22 and the ring roller 23 become equal. To satisfy equation (2) and equation (3), the radius of the sun roller 21 is made larger than the ratio $r_1$ of the working pitch of the sun gear 11 by an amount $\Delta r_1$, and the radius of the planetary roller 22 is made smaller than the radius $r_{21}$ of the working pitch circle of the planetary gear 12 meshing with the sun gear 11 by an amount $\Delta r_1$, and the inside radius of the ring roller 23 is set so that it contacts the radius of the planetary roller 22. As a result, the slippage ratio $s_1$ between the sun roller 21 and the planetary roller 22 and the slippage ratio $s_2$ between the planetary roller 22 and the ring roller 23 can be made equal. Since $s_1$ and $s_2$ are equal, the tractive force F generated by the two rollers acts in the same direction, so the total tractive force is 2F, so a large torque is obtained.

With the composite planetary speed reduction device 1 of this example, even if backlash between the gears of the planetary gear mechanism 10 is allowed for the purpose of reducing costs, zero backlash can be achieved since there is no backlash between the rollers of planetary roller speed reduction mechanism 20.

Also, since a large torque output can be obtained from the planetary roller speed reduction mechanism 20, in the low torque region of the planetary gear mechanism the function of the planetary roller mechanism 20 is superior to that of the planetary gear speed reduction mechanism 10, the impact on the drive side tooth surfaces of the gears is decreased, making it possible to reduce meshing noise. Also, since a large output torque is obtained from the planetary roller speed reduction mechanism 20, torsional stiffness in the low torque region of the planetary gear speed reduction mechanism 10 can be increased.

Moreover, in high torque regions the planetary gear speed reduction mechanism 10 becomes superior, enabling the transmission of high torque.

EXAMPLE

An example of the composite planetary speed reduction device 1 having the above configuration will now be described. A sun gear having a number of teeth $Z_a=24$, planetary gears each having a number of teeth $Z_b=36$, and an internal gear having a number of teeth $Z_d=96$ is a general example of a tooth-number combination used in planetary gear speed reduction mechanisms. In this case, the speed reduction ratio $U_g$ is 1/5. Because addendum modification coefficient of zero can be used for the gears, enabling the use of standard gears and eliminating the task of design, this combination of teeth numbers is extensively used. However, in this tooth-number combination, the value of j defined by the above equation (1) is zero, so slippage ratios $s_1$ and $s_2$ between rollers are also zero, so a large tractive force cannot be obtained (see the schematic drawing of FIG. 3).

In this example, the number of teeth of the planetary gear 12 is reduced by one, to $Z_b=35$, and $j=1$. In this case, the reduction ratio of the planetary gear speed reduction mechanism 10 is the same as the above, $U_g=1/5$. Also, each gear of the planetary gear speed reduction mechanism 10 is an involute spur gear; the gear data are shown in Table 1. As can be seen from the table, $r_{21}>r_{23}$.

TABLE 1

|  | Sun Gear | Planetary Gear | Internal Gear |
| --- | --- | --- | --- |
| Tool | m = 1.0, pressure angle = 20°, full depth tooth | | |
| Number of Teeth | 24 | 35 | 96 |
| Addendum Modification | 0.3529 | 0.3400 | 0 |
| Tool Coefficient | m = 1.0, pressure angle = 20°, full depth tooth | | |
| Center Distance (mm) | — | 30.1436 | — |
| Working Pitch Circle Radius (mm) | 12.2618 | $r_{21}$ = 17.8818<br>$r_{23}$ = 17.2955 | 47.4391 |

Next, when equation (2) is used to calculate the radius increase amount $\Delta r_1$ of the sun roller 21 from the gear data shown in the table, we get $\Delta r_1=0.1236$ mm. Also, $\Delta r_2=0.4626$ is obtained from equation (3). Therefore, the radius of the sun roller 21 is 12.3854 mm, the radius of the planetary roller 22 is 17.7581, and the inside radius of the ring roller 23 is 47.9017. As a result, the speed reduction ratio $U_r$ of the planetary roller speed reduction mechanism 20 is 1/4.868.

Figure 3:
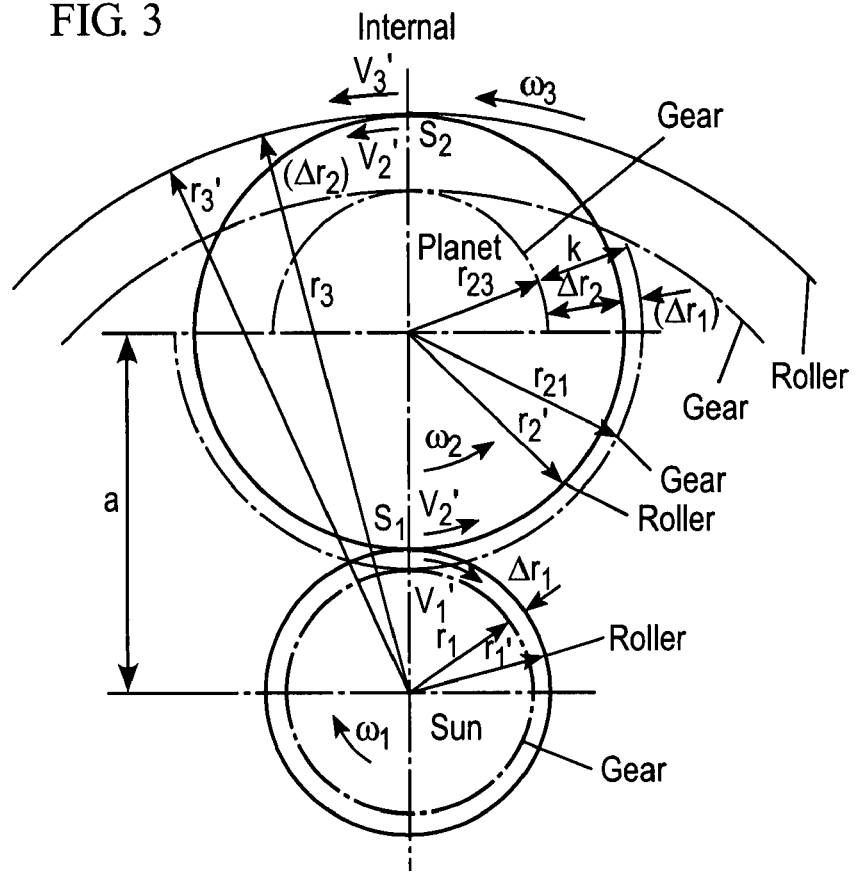
FIG. 3 is a diagram for explaining the calculation methods of equations (2) and (3).
Figure 4:
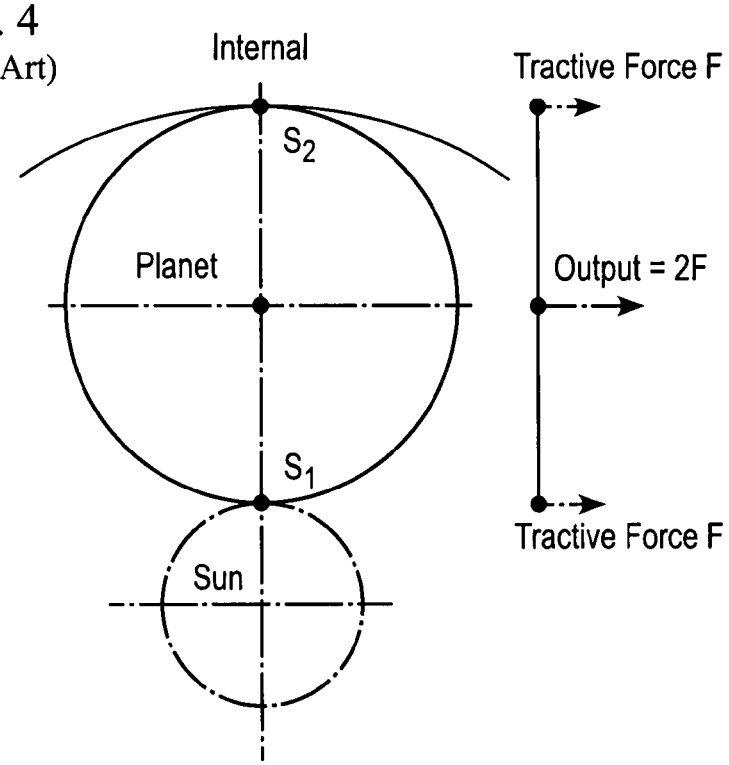
FIG. 4 is a schematic diagram showing the configuration of a conventional composite planetary device.
Figure 5:
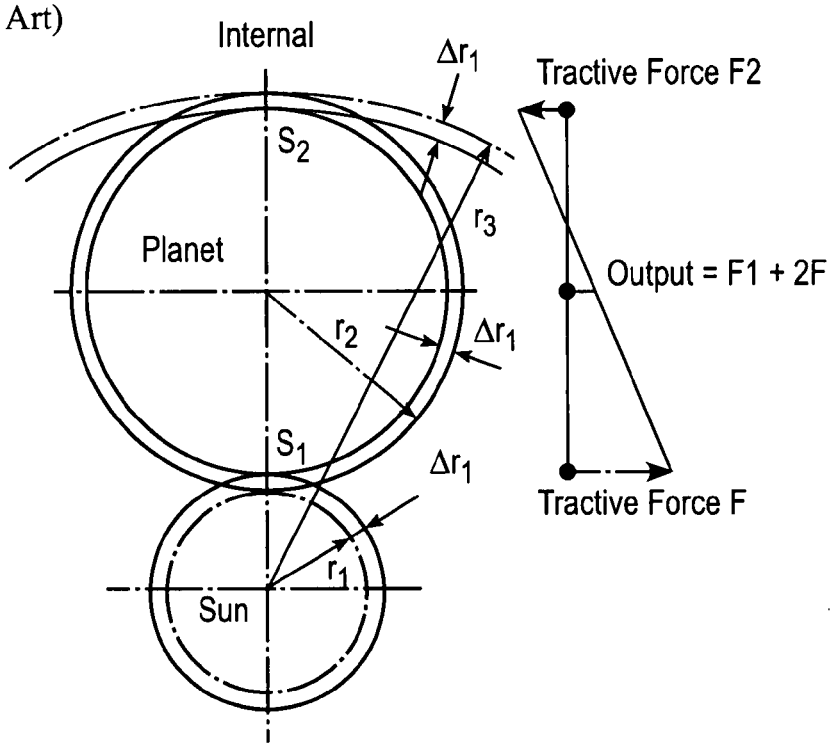
FIG. 5 is a schematic diagram showing the configuration of a conventional composite planetary device.

From the above, the slippage ratio $s_1$ between the sun roller 21 and the planetary roller 22 is 1.7%, and the slippage ratio $s_2$ between the planetary roller 22 and the ring roller 23 is 1.7%, satisfying $s_1=s_2$, so that as shown in the schematic drawing of FIG. 3, a planetary roller speed reduction mechanism 20 can be achieved that can output a large tractive force.

(Method of Calculating Equations (2) and (3))

The method of calculating equations (2) and (3) will now be explained with reference to FIG. 3.

(1) Finding the slippage ratio between rollers when the roller radius is made $\Delta r$ larger or smaller than the radius of the working pitch circle of a gear (carrier fixed).

(a) Slippage ratio $s_1$ (between sun roller and planetary roller)

$$s_1 = \frac{v'_1 - v'_2}{\frac{v'_1 + v'_2}{2}} \tag{A}$$

$$= \frac{2(r'_1\omega_1 - r'_2\omega_2)}{r'_1\omega_1 + r'_2\omega_2}$$

$$= \frac{2[(r_1 + \Delta r_1)\omega_1 - (r_{21} - \Delta r_1)\omega_2]}{(r_1 + \Delta r_1)\omega_1 + (r_{21} - \Delta r_1)\omega_2}$$

$$= \frac{2\left[(r_1 + \Delta r_1)\omega_1 - (r_{21} - \Delta r_1)\frac{r_1}{r_{21}}\omega_1\right]}{(r_1 + \Delta r_1)\omega_1 + (r_{21} - \Delta r_1)\frac{r_1}{r_{21}}\omega_1}$$

$$= \frac{2\left[(r_1 + \Delta r_1) - (r_{21} - \Delta r_1)\frac{r_1}{r_{21}}\right]}{(r_1 + \Delta r_1) + (r_{21} - \Delta r_1)\frac{r_1}{r_{21}}}$$

$$= \frac{2\left[(r_1 + \Delta r_1) - \left(r_1 - \Delta r_1\frac{r_1}{r_{21}}\right)\right]}{(r_1 + \Delta r_1) + \left(r_1 - \Delta r_1\frac{r_1}{r_{21}}\right)}$$

$$= \frac{2\Delta r_1\left(1 + \frac{r_1}{r_{21}}\right)}{2r_1 + \Delta r_1\left(1 - \frac{r_1}{r_{21}}\right)}, \left[2r_1 \gg \Delta r_1\left(1 - \frac{r_1}{r_{21}}\right)\right]$$

$$\cong \frac{\Delta r_1\left(1 + \frac{r_1}{r_{21}}\right)}{r_1}$$

(b) Slippage ratio $s_2$ (between planetary roller and internal gear roller)

$$s_2 = \frac{v_2' - v_3'}{\frac{v_2' + v_3'}{2}} \quad (B)$$

$$= \frac{2(r_2'\omega_2 - r_3'\omega_3)}{r_2'\omega_2 + r_3'\omega_3}$$

$$= \frac{2[(r_{23} + \Delta r_2)\omega_2 - (r_3 + \Delta r_2)\omega_3]}{(r_{23} + \Delta r_2)\omega_2 + (r_3 + \Delta r_2)\omega_3}$$

$$= \frac{2\left[(r_{23} + \Delta r_2)\omega_2 - (r_3 + \Delta r_2)\frac{r_{23}}{r_3}\omega_2\right]}{(r_{23} + \Delta r_2)\omega_2 + (r_3 + \Delta r_2)\frac{r_{23}}{r_3}\omega_2}$$

$$= \frac{2\left[(r_{23} + \Delta r_2) - (r_3 + \Delta r_2)\frac{r_{23}}{r_3}\right]}{(r_{23} + \Delta r_2) + (r_3 + \Delta r_2)\frac{r_{23}}{r_3}}$$

$$= \frac{2\left[(r_{23} + \Delta r_2) - \left(r_{23} + \Delta r_2 \frac{r_{23}}{r_3}\right)\right]}{(r_{23} + \Delta r_2) + \left(r_{23} + \Delta r_2 \frac{r_{23}}{r_3}\right)}$$

$$= \frac{2\Delta r_2\left(1 - \frac{r_{23}}{r_3}\right)}{2r_{23} + \Delta r_2\left(1 + \frac{r_{23}}{r_3}\right)}, \left[2r_{23} \gg \Delta r_2\left(1 + \frac{r_{23}}{r_3}\right)\right]$$

$$\cong \frac{\Delta r_2\left(1 + \frac{r_{23}}{r_3}\right)}{r_{23}}$$

(2) $\Delta r_1$ and $\Delta r_2$ that constitute $s_1 = s_2$

Equating equation (A) and equation (B)

$$\frac{\Delta r_1\left(1 + \frac{r_1}{r_{21}}\right)}{r_1} = \frac{\Delta r_2\left(1 - \frac{r_{23}}{r_3}\right)}{r_{23}} \quad (C)$$

$$\frac{\Delta r_1}{\Delta r_2} = \frac{r_1\left(1 - \frac{r_{23}}{r_3}\right)}{r_{23}\left(1 + \frac{r_1}{r_{21}}\right)}$$

Also, as is clear from the figure $$\Delta r_1 + \Delta r_2 = r_{21} - r_{23} \quad (D)$$

Substituting $\Delta r_2$ from equation (D) into equation (C)

$$\frac{\Delta r_1}{r_{21} - r_{23} - \Delta r_1} = \frac{r_1\left(1 - \frac{r_{23}}{r_3}\right)}{r_{23}\left(1 + \frac{r_1}{r_{21}}\right)} \quad (2)$$

$$\frac{\Delta r_1}{r_{21} - r_{23} - \Delta r_1} = \frac{r_{23}\left(1 + \frac{r_1}{r_{21}}\right)}{r_1\left(1 - \frac{r_{23}}{r_3}\right)}$$

$$r_{21} - r_{23} - \Delta r_1 = \frac{r_{23}\left(1 + \frac{r_1}{r_{21}}\right)}{r_1\left(1 - \frac{r_{23}}{r_3}\right)}\Delta r_1$$

$$r_{21} - r_{23} = \frac{r_{23}\left(1 + \frac{r_1}{r_{21}}\right)}{r_1\left(1 - \frac{r_{23}}{r_3}\right)}\Delta r_1 + \Delta r_1$$

$$= \left[\frac{r_{23}\left(1 + \frac{r_1}{r_{21}}\right)}{r_1\left(1 - \frac{r_{23}}{r_3}\right)} + 1\right]\Delta r_1$$

Therefore, $$\Delta r_1 = \frac{r_{21} - r_{23}}{\frac{r_{23}\left(1 + \frac{r_1}{r_{21}}\right)}{r_1\left(1 - \frac{r_{23}}{r_3}\right)} + 1}$$

And, from equation (D)

$$\Delta r_2 + \Delta r_{21} = r_{23} - r_1 \quad (3)$$

SYMBOLS a: Center distance
$r_1$: Radius of working pitch circle of the sun gear
$r_{21}$: Radius of the working pitch circle of the planetary gear meshing with the sun gear
$r_{23}$: Radius of the working pitch circle of the planetary gear meshing with the internal gear
$r_3$: Radius of working pitch circle of the internal gear
$r_1'$: Outside diameter of the sun roller ($r_1' = r_1 + \Delta r_1$)
$r_2'$: Outside diameter of the planetary roller ($r_2' = r_{21} - \Delta r_1$ or $r_2' = r_{23} + \Delta r_2$)
$r_3'$: Inside diameter of the internal gear roller ($r_3' = r_3 + \Delta r_2$)
$s_1$: Slippage ratio between sun roller and planetary roller
$s_2$: Slippage ratio between planetary roller and internal gear roller
$v_1'$: Peripheral velocity at the outside radius of the sun roller
$v_2'$: Peripheral velocity at the outside radius of the planetary roller
$v_3'$: Peripheral velocity at the inside radius of the internal gear roller
$\omega_1$: Rotational angle velocity of the sun gear
$\omega_2$: Rotational angle velocity of the planetary gear
$\omega_3$: Rotational angle velocity of the internal gear
$\Delta r_1$: Radius increase amount of the sun roller
$\Delta r_2$: Radius increase amount of the planetary roller

The invention claimed is:

1. A composite planetary device, comprising:
   a planetary gear mechanism equipped with a sun gear, at least one planetary gear and an internal gear; and
   a planetary roller mechanism equipped with a sun roller, at least one planetary roller and a ring roller;
   wherein the sun gear and the sun roller are integrally rotated around a common rotating center axis, the corresponding planetary gear and the planetary roller are integrally rotated around a common planetary shaft, and the internal gear and the ring roller rotate integrally around the rotating center axis or can be fixed concentrically,
   wherein a radius of the sun roller is larger by ($\Delta r_1$) than a radius ($r_1$) of a working pitch circle of the sun gear,
   a radius of the planetary roller is smaller by ($\Delta r_1$) than a radius ($r_{21}$) of a working pitch circle of the planetary gear,
   the radius ($r_{21}$) of the working pitch circle of the planetary gear meshing with the sun gear is larger than a radius ($r_{23}$) of a working pitch circle of the planetary gear meshing with the internal gear.

2. The composite planetary device according to claim 1, wherein
   gears of the planetary gear mechanism have numbers of teeth that satisfy equation (1), the radius of the sun roller is larger than the radius of the working pitch circle of the sun gear by a radius increase amount ($\Delta r_1$) given by equation (2), the radius of the planetary roller is larger than the radius of the working pitch circle of the planetary gear meshing with the internal gear by an amount ($\Delta r_2$) given by equation (3)

$$j = (Z_d - Z_a)/2 - Z_b > 0 \quad (1)$$

where j: Planetary gear teeth reduction number
$Z_a$: Number of sun gear teeth
$Z_b$: Number of planetary gear teeth
$Z_d$: Number of internal gear teeth $$\Delta r_1 = \frac{r_{21} - r_{23}}{\frac{r_{23}\left(1 + \frac{r_1}{r_{21}}\right)}{r_1\left(1 - \frac{r_{23}}{r_3}\right)} + 1} \quad (2)$$

where $r_1$: Radius of working pitch circle of sun gear
$r_{21}$: Radius of the working pitch circle of the planetary gear meshing with the sun gear
$r_{23}$: Radius of the working pitch circle of the planetary gear meshing with the internal gear
$r_3$: Radius of the working pitch circle of the internal gear $$\Delta r_2 = r_{21} - r_{23} - \Delta r_1 \quad (3).$$

* * * * *